(12) United States Patent
Saito

(10) Patent No.: US 12,510,111 B2
(45) Date of Patent: Dec. 30, 2025

(54) ROLLED THREAD SCREW AND ROLLED THREAD SCREW MANUFACTURING METHOD

(71) Applicant: NSK LTD., Tokyo (JP)

(72) Inventor: Takeshi Saito, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/919,675

(22) Filed: Oct. 18, 2024

(65) Prior Publication Data

US 2025/0043813 A1 Feb. 6, 2025

Related U.S. Application Data

(62) Division of application No. 17/641,245, filed as application No. PCT/JP2020/033566 on Sep. 4, 2020, now Pat. No. 12,152,624.

(30) Foreign Application Priority Data

Sep. 13, 2019 (JP) ................... 2019-167702

(51) Int. Cl.
 *F16B 33/00* (2006.01)
 *B21H 3/04* (2006.01)
 *F16B 33/02* (2006.01)

(52) U.S. Cl.
 CPC ............... *F16B 33/02* (2013.01); *B21H 3/04* (2013.01)

(58) Field of Classification Search
 CPC ........ F16B 33/02; F16B 35/00; F16B 33/008; F16B 25/00; F16B 37/00; B21H 3/04
 See application file for complete search history.

(56) References Cited

U.S. PATENT DOCUMENTS

2011/0183573 A1* 7/2011 Ozeki ..................... H01T 21/02
                                                                          445/7

FOREIGN PATENT DOCUMENTS

| CN | 1398325 A |   | 2/2003 |
|----|-----------|---|--------|
| JP | 2003148586 A | * | 5/2003 |
| JP | 2005-074509 A |   | 3/2005 |
| JP | 2005-121216 A |   | 5/2005 |
| JP | 2005-299706 A |   | 10/2005 |

(Continued)

OTHER PUBLICATIONS

International Search Report for PCT/JP2020/033566 dated Nov. 10, 2020 (PCT/ISA/210).

*Primary Examiner* — Zakaria Elahmadi
(74) *Attorney, Agent, or Firm* — Sughrue Mion, PLLC

(57) ABSTRACT

A rolled thread screw includes: a screw part having, on an outer circumferential part of the screw part, thread crests and thread grooves disposed alternately along an axial direction of the rolled thread screw; and a columnar part adjoining at least one of both sides of the screw part in the axial direction. An axial end surface of the columnar part is provided with: a first concave surface concave in the axial direction; a second concave surface positioned to an outer circumference of the first concave surface and being concave in the axial direction; and a salient part positioned on a boundary between the first concave surface and the second concave surface and projecting further than a bottom of the first concave surface and a bottom of the second concave surface, the salient part extending in an arc-like shape along a circumferential direction of the columnar part as viewed in the axial direction.

1 Claim, 9 Drawing Sheets

(56) References Cited

FOREIGN PATENT DOCUMENTS

| | | | |
|---|---|---|---|
| JP | 2006-346684 | A | 12/2006 |
| JP | 2009-233705 | A | 10/2009 |
| JP | 4367833 | B2 | 11/2009 |
| JP | 2011-167749 | A | 9/2011 |
| JP | 5053399 | B2 | 10/2012 |
| WO | 2018158845 | A1 | 9/2018 |
| WO | 2020230898 | A1 | 11/2020 |

\* cited by examiner

ROLLED THREAD SCREW AND ROLLED THREAD SCREW MANUFACTURING METHOD

CROSS-REFERENCE TO RELATED APPLICATION

This application is a divisional of U.S. application Ser. No. 17/641,245, filed Mar. 8, 2022, which is a National Stage of International Application No. PCT/JP2020/033566, filed on Sep. 4, 2020, which claims priority to Japanese Patent Application No. 2019-167702, filed on Sep. 13, 2019, the disclosures of which is incorporated herein in its entirety by reference.

FIELD

The present disclosure relates to a rolled thread screw and a rolled thread screw manufacturing method.

BACKGROUND

Rolled thread screw manufacturing methods include, for example, through-feed thread rolling and in-feed thread rolling. Application examples of through-feed thread rolling are described in, for example, Patent Literature 1 and Patent Literature 2. Through-feed thread rolling is a thread rolling method in which pressure is applied to an outer circumferential portion of a long blank while the blank is moved in an axial direction of the blank between a pair of dies that are rotating. That is, through-feed thread rolling is a method in which thread rolling is performed on a continuous long blank to obtain a screw material therefrom, and the long screw material thus obtained by the thread rolling is cut into parts each of a certain length to obtain individual rolled thread screws therefrom. In contrast, in-feed thread rolling is a thread rolling method in which pressure is applied to an outer circumferential portion of a blank already cut into a length of an individual screw while the blank is placed between a pair of dies that are rotating. Thus, as compared with in-feed thread rolling, through-feed thread rolling tends to produce burrs and sharp edges on rolled thread screws when a post-process such as cutting is performed after thread rolling.

CITATION LIST

Patent Literature

Patent Literature 1: Japanese Patent Application Laid-open No. 2009-233705 A
Patent Literature 2: Japanese Patent Application Laid-open No. 2005-74509 A

SUMMARY

Technical Problem

A rolled thread screw and a rolled thread screw manufacturing method that reduce burrs are desired when in-feed thread rolling is used.

The present disclosure has been made in view of the above inconvenience, and is directed to providing a rolled thread screw and a rolled thread screw manufacturing method that reduce burrs when in-feed thread rolling is used.

Solution to Problem

To achieve the above object, a rolled thread screw according to an embodiment of the present disclosure comprising: a screw part having, on an outer circumferential part of the screw part, thread crests and thread grooves disposed alternately along an axial direction of the rolled thread screw; and a columnar part adjoining at least one of both sides of the screw part in the axial direction, wherein an axial end surface of the columnar part is provided with a first concave surface concave in the axial direction, a second concave surface positioned to an outer circumference of the first concave surface and being concave in the axial direction, and a salient part positioned on a boundary between the first concave surface and the second concave surface and projecting further than a bottom of the first concave surface and a bottom of the second concave surface, the salient part extending in an arc-like shape along a circumferential direction of the columnar part as viewed in the axial direction.

Salient excess-thickness portions, such as columnar parts and truncated cone parts, are provided on end parts of the blank, which is used in manufacturing the rolled thread screw. End-part wall surfaces of the screw part are thereby prevented from falling down into shapes extending in the axial direction, which become burrs. Parts of these excess-thickness portions are formed into the first concave surface, the second concave surface, and the salient part through thread rolling. The axial end surface of the columnar part is formed flatly because the first concave surface and the second concave surface extend along radial directions of the columnar part. As a result, the rolled thread screw that has prevented generation of burrs and that has the axial end surface of the columnar parts formed flatly can be obtained.

A rolled thread screw manufacturing method according to an embodiment of the present disclosure comprising: a preparation step of preparing a blank; and a processing step of plastically deforming the blank into a rolled thread screw, wherein the blank that is prepared at the preparation step is a columnar blank including a first truncated cone part having a first outer circumferential surface having an outer diameter that is larger toward one side of the rolled thread screw that faces in a first axial direction of the rolled thread screw, a second truncated cone part disposed adjoining one side of the first truncated cone part that faces in the first axial direction and having a second outer circumferential surface having an outer diameter that is larger toward the one side of the rolled thread screw, a first columnar part adjoining one side of the second truncated cone part that faces in the first axial direction, a second columnar part adjoining one side of the first columnar part that faces in the first axial direction and having a larger outer diameter than the first columnar part, an outer diameter of an end of the first truncated cone part that faces in the first axial direction is identical to an outer diameter of an end of the second truncated cone part that faces in a second axial direction that is opposite to the first axial direction, an outer diameter of an end of the second truncated cone part that faces in the first axial direction is equal to an outer diameter of an end of the first columnar part that faces in the second axial direction, and at the processing step, thread rolling in which pressure is applied to an outer circumferential part of the second columnar part inward in radial directions of the rolled thread screw is performed to form thread grooves, and the first outer circumferential surface of the first truncated cone part and the second outer circumferential surface of the second truncated cone part are thereby plastically deformed in such a manner as to span along the radial directions.

Salient excess-thickness portions, such as the first truncated cone part, the second truncated cone part, and the first columnar part, are provided to one side of the blank that is prepared at the preparation step of the present disclosure, the one side facing in the second axial direction. It is thereby made possible to prevent the end-part wall surfaces of the screw part from falling down into shapes extending in the axial directions, which become burrs. As a result, work of removing burrs such as buffing and deburring grinding is reduced. Quality checking work for checking whether there is any burr can also be reduced. In addition, the application of in-feed thread rolling to this case is advantageous in that a production yield from the blank is improved.

As a desirable embodiment of the rolled thread screw manufacturing method, at the processing step, the first outer circumferential surface is formed into a first concave surface spreading in the radial directions and being concave in the first axial direction, the second outer circumferential surface is formed into a second concave surface disposed to an outer circumference of the first concave surface, spreading in the radial directions, and being concave in the first axial direction, and a salient part projecting in the second axial direction is formed on a boundary between the first concave surface and the second concave surface, the salient part extending in an arc-like shape along a circumferential direction as viewed in the axial direction.

At the processing step, the first outer circumferential surface is deformed into the first concave surface, the second outer circumferential surface is deformed into the second concave surface, and the first concave surface and the second concave surface are deformed in such a manner as to span along the radial directions. As a result, an axial end surface of the screw part spreads in the radial directions to become flat. Thus, the thread grooves can be provided on the screw part including an end part thereof in the axial direction, whereby the effective length of the screw part can be set longer than otherwise.

Advantageous Effects of Invention

According to the present disclosure, a rolled thread screw and a rolled thread screw manufacturing method that reduce burrs are provided when in-feed thread rolling is used.

DESCRIPTION OF EMBODIMENTS

The following describes a mode for carrying out the invention (hereinafter "embodiment") in detail with reference to the drawings. The following embodiment is not intended to limit the present invention. The constituent elements in the following embodiment include those easily conceivable by the skilled person, those substantially identical to each other, and those that fall within what is called the range of equivalents. The constituent elements described in the following embodiment can be combined as appropriate.

Embodiment

Figure 1:
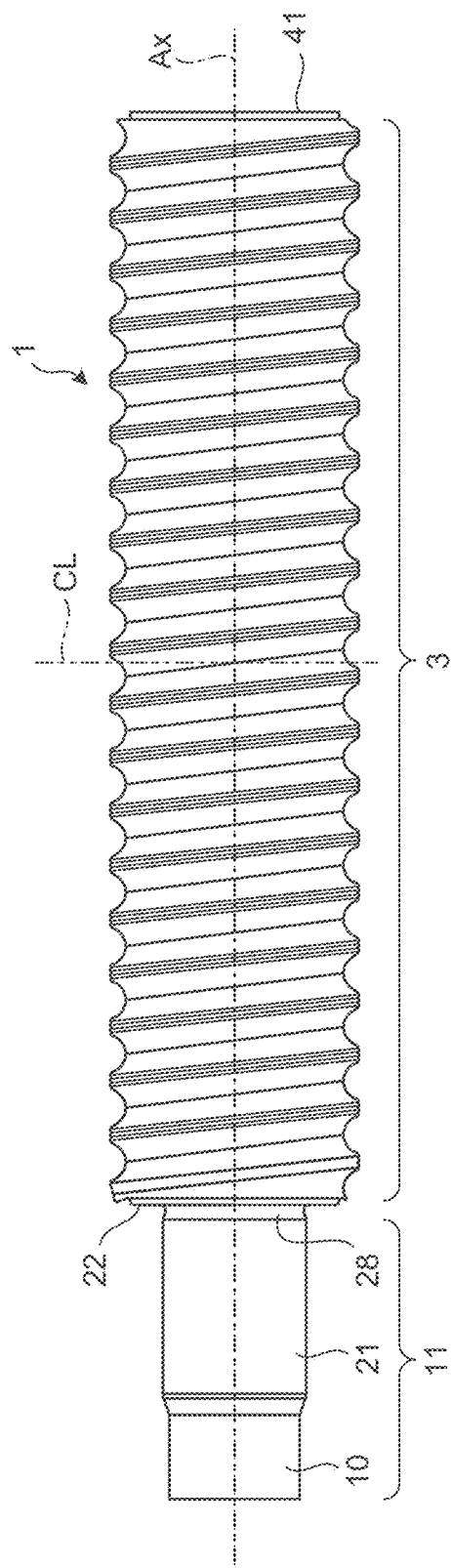
FIG. 1 is a side view of a rolled thread screw according to an embodiment, as viewed from one side thereof.
Figure 2:
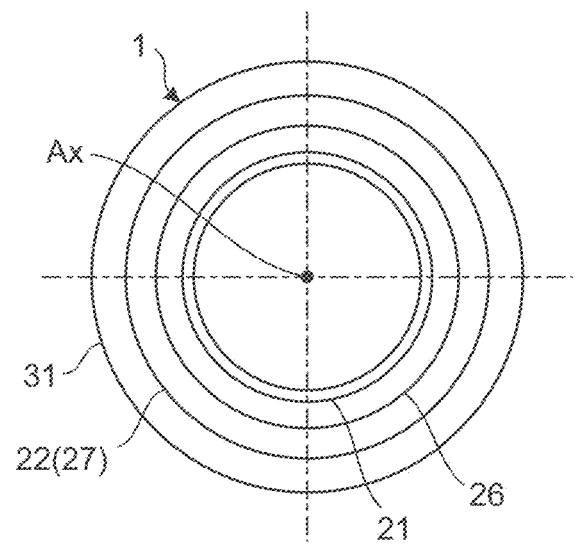
FIG. 2 is a view of FIG. 1 as viewed in an axial direction of the rolled thread screw.
Figure 3:
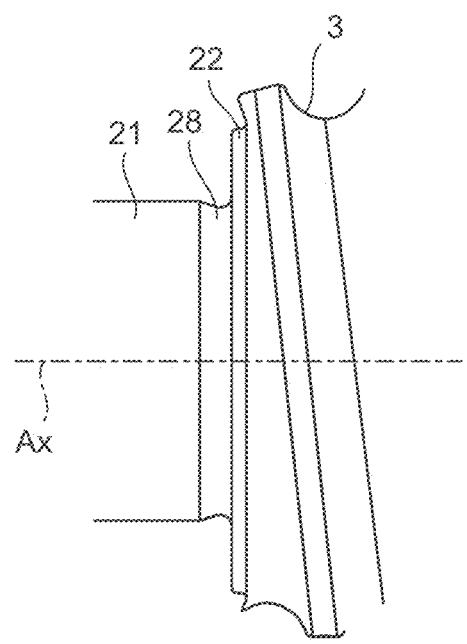
FIG. 3 is an enlarged side view of an end part of a screw part in FIG. 2 that faces in a second axial direction.
Figure 4:
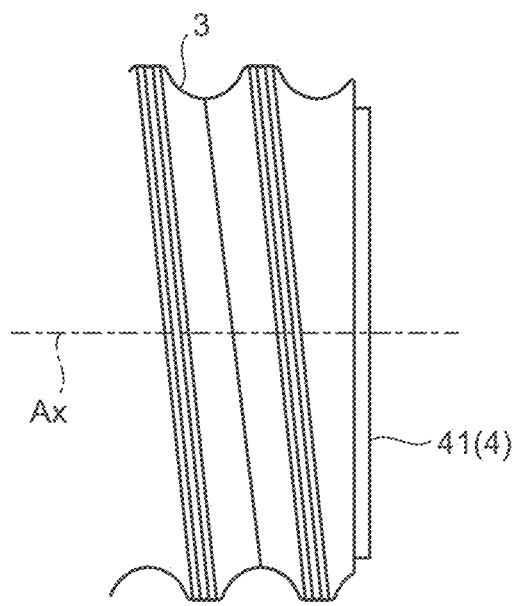
FIG. 4 is an enlarged side view of another end part of the screw part in FIG. 2 that faces in a first axial direction.
Figure 5:
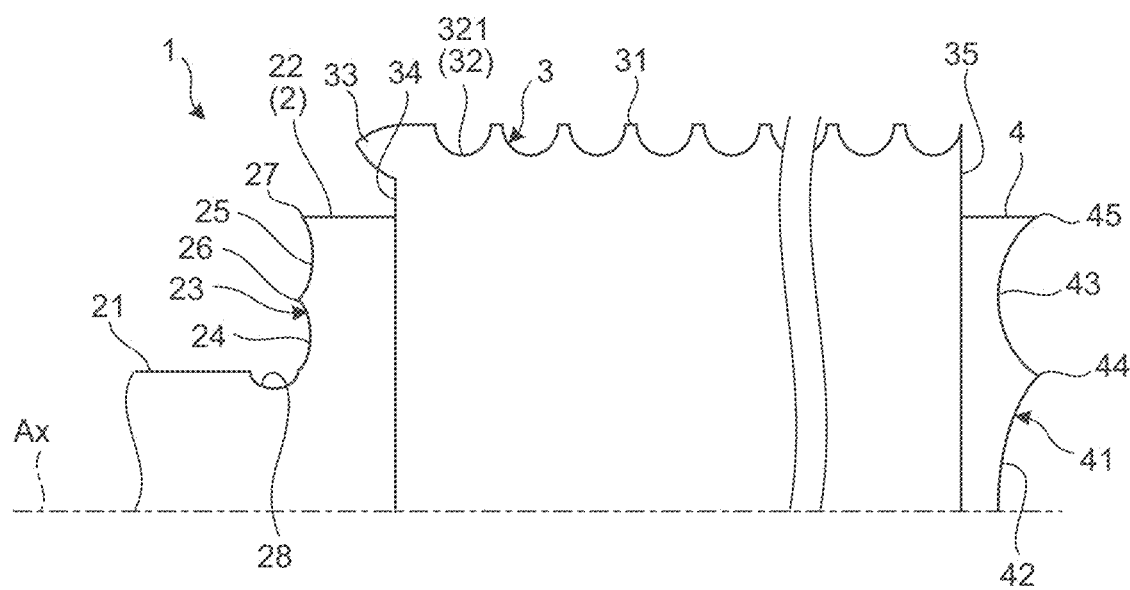
FIG. 5 is an enlarged schematic view of FIG. 3.

First, a rolled thread screw 1 according to the embodiment is described. FIG. 1 is a side view of a rolled thread screw according to an embodiment, as viewed from one side thereof. FIG. 2 is a view of FIG. 1 as viewed in an axial direction of the rolled thread screw. FIG. 3 is an enlarged side view of an end part of a screw part in FIG. 2 that faces in a second axial direction. FIG. 4 is an enlarged side view of another end part of the screw part in FIG. 2 that faces in a first axial direction. FIG. 5 is an enlarged schematic view of FIG. 3. The axial directions herein mean directions along a shaft center Ax of the rolled thread screw 1. A radial direction means a direction perpendicular to the shaft center Ax. Facing in the first axial direction means facing rightward in FIG. 1, and facing in the second axial direction means facing leftward in FIG. 1.

As illustrated in FIG. 1 to FIG. 5, the rolled thread screw 1 includes a shaft part 11, columnar parts 2 and 4, and a screw part 3. The shaft part 11 includes, in order along the axial directions, a narrow-diameter part 10, a small-diameter part 21, and a groove part 28. The narrow-diameter part 10 and the small-diameter part 21 are columnar. The small-diameter part 21 adjoins one side that faces in the first axial direction (a rightward side in FIG. 1) of the narrow-diameter part 10. The small-diameter part 21 has a larger outer diameter than the narrow-diameter part 10. The groove part 28 adjoins one side that faces in the first axial direction (a rightward side in FIG. 1) of the small-diameter part 21. The groove part 28 has an arc-like shape concave inward in the radial directions.

As illustrated in FIG. 1 and FIG. 5, a large-diameter part 22 (a columnar part 2) adjoins one side that faces in the first axial direction (a rightward side in FIG. 1) of the groove part 28. The large-diameter part 22 is referred to also as the columnar part 2. The large-diameter part 22 has a larger outer diameter than the small-diameter part 21. The large-diameter part 22 has an axial end surface 23 stretching in the radial directions. The axial end surface 23 is positioned at an end that faces in the second axial direction (a leftward side in FIG. 1) of the large-diameter part 22. The axial end surface 23 includes a first concave surface 24 and a second concave surface 25. Preferably, the diameter of the large-diameter part 22 is, for example, +3% to −25% of a root part 321 of each thread groove 32. The first concave surface 24 is provided on the axial end surface 23 of the large-diameter part 22 (the columnar part 2) and is concave in the first axial direction. The second concave surface 25 is provided on the axial end surface 23 of the large-diameter part 22 (the columnar part 2) and is concave in the first axial direction. The second concave surface 25 is positioned to the outer circumference of the first concave surface 24.

Here, when the center of the screw part 3 in the axial direction is denoted as a first central part CL (see FIG. 1), the first concave surface 24 is a concave surface that is concave toward the first central part CL. The second concave surface 25 is a concave surface that is concave toward the first central part CL. The first concave surface 24 and the second concave surface 25 have annular shapes centered at the shaft center Ax. A salient part 26 is provided on the boundary between the first concave surface 24 and the second concave surface 25. The salient part 26 projects in the second axial direction (leftward in FIG. 1). In other words, the salient part 26 projects in a direction going away from the first central part CL. Furthermore, as illustrated in FIG. 2, the salient part 26 extends in an annular shape or an arc-like shape along a circumferential direction. The boundary between the second concave surface 25 and the outer circumferential surface of the large-diameter part 22 is an outer circumferential end 27 of the second concave surface 25.

The screw part 3 has, on the outer circumferential part thereof, thread crests 31 and thread grooves 32 disposed alternately along the axial direction. The shape of a section of each of the thread grooves 32 is arc-like. The thread groove 32 has a root part 321. The root part 321 is the innermost region of the thread groove 32 in the radial directions. An end-part wall surface 34 and an end-part wall surface 35 are provided to both ends of the screw part 3 in the axial direction. While the end-part wall surface 35 is an end surface of the screw part 3 that faces in the first axial direction, the end-part wall surface 34 is another end surface thereof that faces in the second axial direction. A swelling part 33 protruding in the second axial direction is provided on the end-part wall surface 34. The leading end of the swelling part 33, which faces in the second axial direction, is positioned further in the first axial direction than the axial end surface 23. The salient part 26 described above is positioned further in the radial directions from the root part 321 of each of the thread grooves 32.

A columnar part 4 adjoins one side of the end-part wall surface 35 that faces in the first axial direction. The columnar part 4 spreads outward in the radial directions with the shaft center Ax at the center thereof. The columnar part 4 includes an axial end surface 41. The axial end surface 41 may have a QR code (registered trademark) or data for product management engraved thereon by laser processing or the like. The axial end surface 41 includes a first concave surface 42 and a second concave surface 43. The first concave surface 42 is provided on the axial end surface 41 of the columnar part 4 and is concave in the second axial direction. The second concave surface 43 is provided on the axial end surface 41 of the columnar part 4 and is concave in the second axial direction. The second concave surface 43 is positioned to the outer circumference of the first concave surface 42. In other words, the first concave surface 42 is a concave surface that is concave toward the first central part CL (see FIG. 1), and the second concave surface 43 is a concave surface that is concave toward the first central part CL. The first concave surface 42 and the second concave surface 43 have annular shapes centered at the shaft center Ax. A salient part 44 is provided on the boundary between the first concave surface 42 and the second concave surface 43. The boundary between the second concave surface 43 and the outer circumferential surface of the columnar part 4 is an outer circumferential end 45 of the second concave surface 43.

Figure 6:
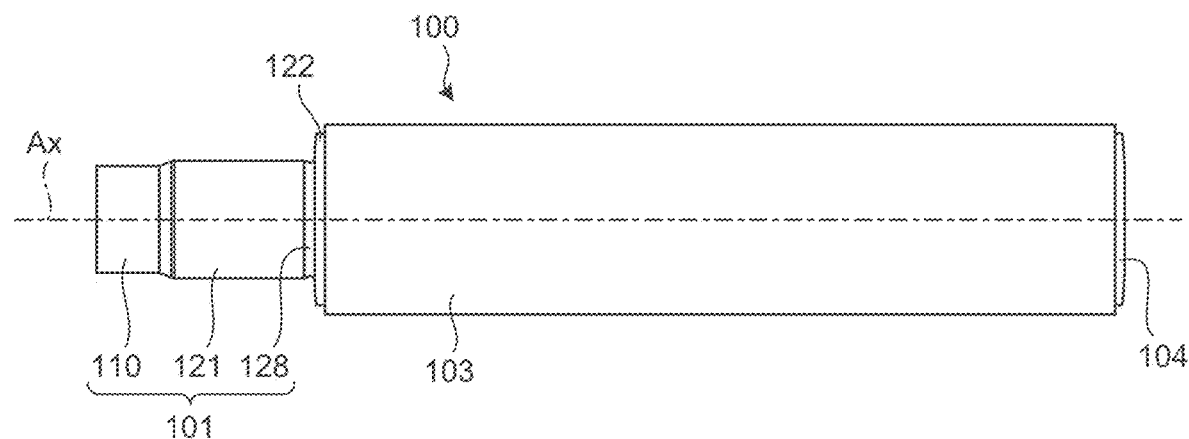
FIG. 6 is a side view illustrating a blank for the rolled thread screw according to the embodiment.
Figure 7:
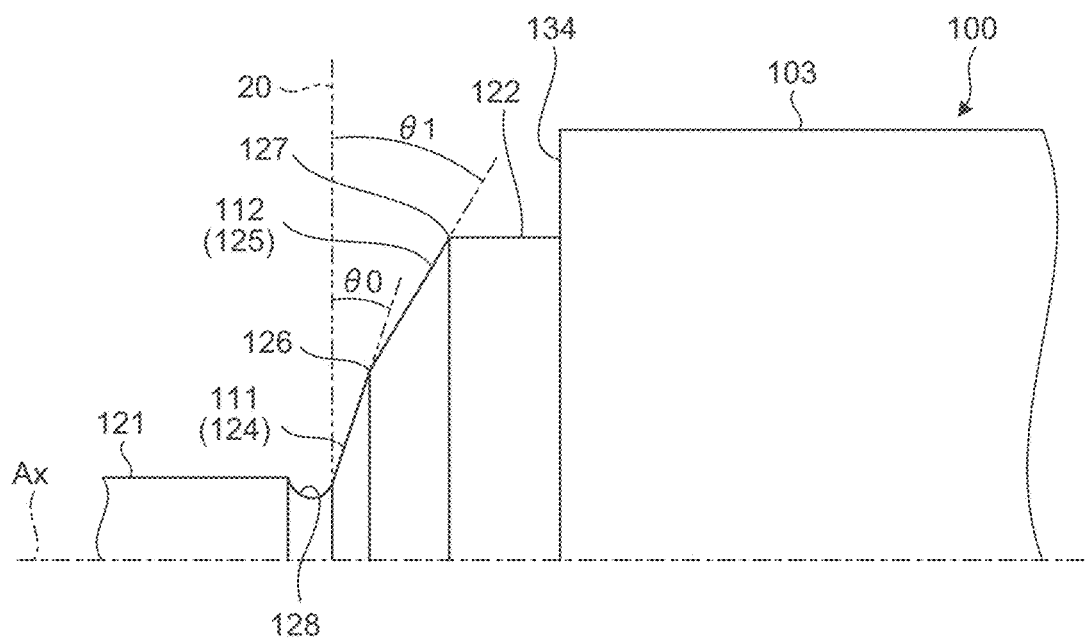
FIG. 7 is an enlarged side view of a part of FIG. 6.
Figure 8:
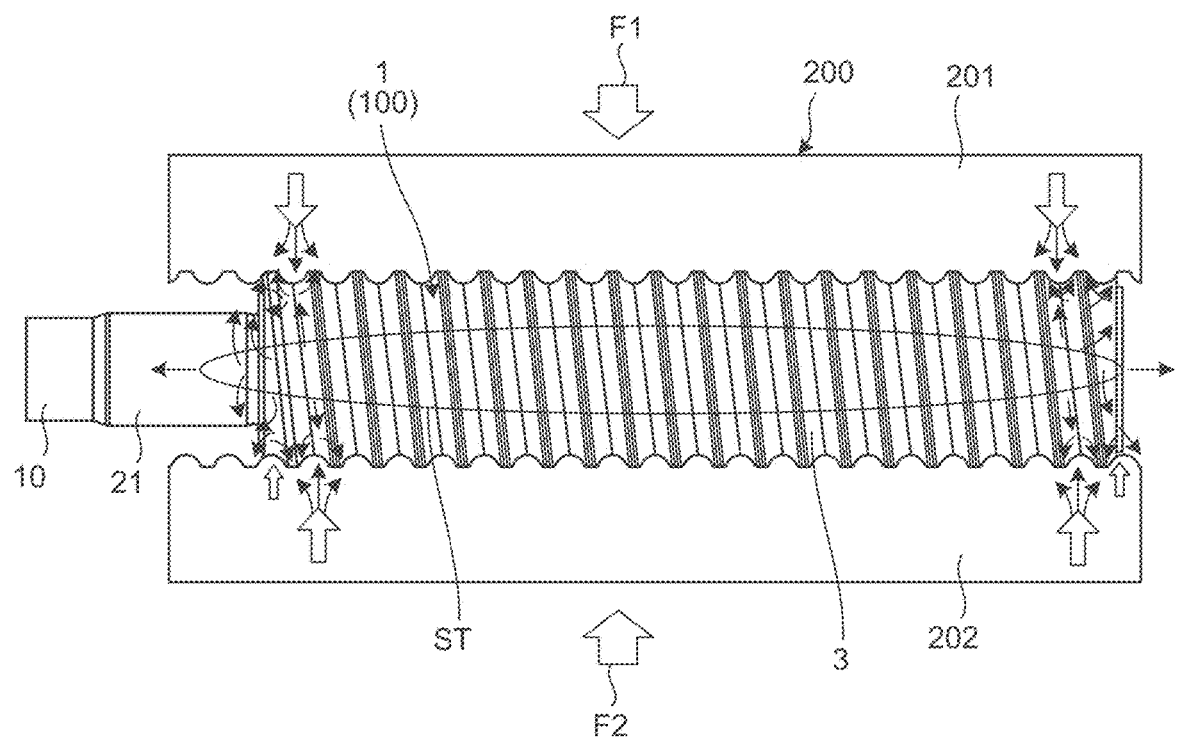
FIG. 8 is a schematic view illustrating a state in which thread rolling is being performed on a blank.

Next, a rolled thread screw manufacturing method is described. FIG. 6 is a side view illustrating a blank for the rolled thread screw according to the embodiment. FIG. 7 is an enlarged side view of a part of FIG. 6. FIG. 8 is a schematic view illustrating a state in which thread rolling is being performed on a blank.

First, the shape of a blank 100 for a rolled thread screw is described with reference to FIG. 6 and FIG. 7. The blank 100 has a columnar shape including a shaft part 101, a first truncated cone part 124, a second truncated cone part 125, a first columnar part 122, a second columnar part 103, and a third columnar part 104. Preferably, corner parts of the blank 100 are chamfered.

The shaft part 101 includes a narrow-diameter part 110, a small-diameter part 121, and a groove part 128. The narrow-diameter part 110 and the small-diameter part 121 are columnar. The small-diameter part 121 adjoins one side that faces in the first axial direction (a rightward side in FIG. 6) of the narrow-diameter part 110. The small-diameter part 121 has a larger outer diameter than the narrow-diameter part 110. The groove part 128 adjoins one side that faces in the first axial direction (a rightward side in FIG. 6) of the small-diameter part 121. The groove part 128 has an arc-like shape concave inward in the radial directions.

As illustrated in FIG. 7, the first truncated cone part 124 has a first outer circumferential surface 111. The first outer circumferential surface 111 has a tapered shape the outer diameter of which is larger toward one side (the right side in FIG. 7) thereof in the first axial direction. Here, as illustrated in FIG. 7, the first outer circumferential surface 111 is tilted only by a first tilt angle θ0 to a radial line 20 (indicated by a chain double-dashed line), which is perpendicular to the shaft center Ax. That is, the first outer circumferential surface 111 is tilted toward one side thereof in the first axial direction from the radial line 20 only by the first tilt angle θ0. Preferably, the first tilt angle θ0 is, for example, larger than 0 degrees and less than or equal to 5 degrees. The second truncated cone part 125 has a second outer circumferential surface 112. The second truncated cone part 125 adjoins one side of the first truncated cone part 124 that faces in the first axial direction. The second outer circumferential surface 112 has a tapered shape the outer diameter of which is larger toward the other side thereof in the first axial direction. The second outer circumferential surface 112 is tilted only by a second tilt angle θ1 to the radial line 20. That is, the second outer circumferential surface 112 is tilted toward one side thereof in the first axial direction from the radial line 20 only by the second tilt angle θ1. The second tilt angle θ1 is larger than the first tilt angle θ0. Preferably, the second tilt angle θ1 is, for example, an angle in the range of 100% to 300% of the screw lead angle. A boundary part 126 is provided at the boundary between the first outer circumferential surface 111 and the second outer circumferential surface 112. In other words, the boundary part 126 is an intersection between the first outer circumferential surface 111 and the second outer circumferential surface 112.

The first columnar part 122 adjoins one side of the second outer circumferential surface 112 that faces in the first axial direction. The first columnar part 122 has a larger outer diameter than the small-diameter part 121. An intersection between the outer circumferential surface of the first columnar part 122 and the second outer circumferential surface 112 is an outer circumferential end 127 of the second outer circumferential surface 112. The second columnar part 103 adjoins one side of the first columnar part 122 that faces in the first axial direction. The second columnar part 103 has a larger outer diameter than the first columnar part 122. An end surface of the second columnar part 103 that faces in the second axial direction is an end-part wall surface 134. The outer diameter of an end of the first truncated cone part 124 that faces in the first axial direction is identical to the outer diameter of an end of the second truncated cone part 125 that faces in the second axial direction. The outer diameter of an end of the second truncated cone part 125 that faces in the first axial direction is equal to the outer diameter of an end of the first columnar part 122 that faces in the second axial direction.

Next, specifics of the rolled thread screw manufacturing method are described. As illustrated in FIG. 8, the rolled thread screw 1 is formed by having threads thereof rolled using thread rolling dies 200. In the present embodiment, a mode in which in-feed thread rolling is applied out of in-feed thread rolling and through-feed thread rolling is described. The thread rolling dies 200 include a first thread rolling die 201 and a second thread rolling die 202. Respective outer circumferential parts of the first thread rolling die 201 and the second thread rolling die 202 are provided with annular projecting parts extending along the circumferential directions thereof. The first thread rolling die 201 and the second thread rolling die 202 can be driven to rotate by a drive source that is not illustrated. The first thread rolling die 201 and the second thread rolling die 202 can also be moved closer to and away from each other. The rotational axis of the first thread rolling die 201 and the rotational axis of the second thread rolling die 202 are disposed in parallel.

The first step in the manufacturing method is a preparation step of preparing the blank 100. As described above, the blank 100 has a columnar shape including the shaft part 101, the first truncated cone part 124, the second truncated cone part 125, the first columnar part 122, the second columnar part 103, and the third columnar part 104.

Next, the second step in the manufacturing method is a processing step of plastically deforming the blank 100 into the rolled thread screw 1. Specifically, the blank 100 is placed between the first thread rolling die 201 and the second thread rolling die 202. The first thread rolling die 201 and the second thread rolling die 202 are set apart from each other at a distance larger than the diameter of the second columnar part 103 of the blank 100. Thus, the blank 100 is placed between the first thread rolling die 201 and the second thread rolling die 202 in parallel to the respective rotational axes of the first thread rolling die 201 and the second thread rolling die 202. The first thread rolling die 201 and the second thread rolling die 202 are then moved closer to each other while being rotated. In this manner, forming in which pressure is applied to the second columnar part 103 of the blank 100 inward in the radial directions while being sandwiched between the first thread rolling die 201 and the second thread rolling die 202 is performed. Here, as illustrated in FIG. 8, pressure applied by the first thread rolling die 201 is F1, and pressure applied by the second thread rolling dies 202 is F2. The pressure F1 and the pressure F2 are of the same magnitude. After the entire screw part 3 (the second columnar part 103) receives the pressure F1 and the pressure F2, the pressure F1 and the pressure F2 move toward both sides of the screw part 3 (both leftward and rightward in FIG. 8) in the axial directions. In addition, when the pressure F1 and the pressure F2 are applied to the blank 100, stress ST acts on the blank 100. A range on which the stress ST acts is, as illustrated in FIG. 8, a horizontally long elliptical range extending in the axial directions. The stress ST is larger in both end parts (end parts on the left side and the right side in FIG. 8) of the screw part 3 (the second columnar part 103) in the axial directions than in a central part thereof in the axial direction. Parts of the stress ST that act on the narrow-diameter part 10 and the small-diameter part 21 (the narrow-diameter part 110 and the small-diameter part 121), which are disposed further left from the leftward end part of the screw part 3 (the second columnar part 103) in FIG. 8, are smaller than those of the stress ST that act on the end parts of the screw part 3 (the second columnar part 103) in the axial directions.

This second step forms the thread crests 31 and the thread grooves 32 on the second columnar part 103 (see FIG. 5). In addition, the first outer circumferential surface 111 of the first truncated cone part 124 illustrated in FIG. 7 deforms in such a manner as to become closer to the radial directions. That is, the first tilt angle θ0 in FIG. 7 gradually becomes smaller, and the first outer circumferential surface 111 plastically deforms in such a manner as to move counterclockwise in FIG. 7. The second outer circumferential surface 112 of the second truncated cone part 125 illustrated in FIG. 7 plastically deforms in such a manner as to become closer to the radial directions. That is, the second tilt angle θ1 in FIG. 7 gradually becomes smaller, and the second outer circumferential surface 112 plastically deforms in such a manner as to move counterclockwise in FIG. 7. As a result, the first outer circumferential surface 111 of the blank 100 illustrated in FIG. 7 is turned into the first concave surface 24 in FIG. 5, and the second outer circumferential surface 112 in FIG. 7 is turned into the second concave surface 25 in FIG. 5.

The boundary part 126 of the blank 100 is also turned into the salient part 26. Furthermore, the swelling part 33 illustrated in FIG. 5 is formed by having pressure applied to the second columnar part 103 inward in the radial direction. Also when the columnar part 4 illustrated in FIG. 5 is formed, the axial end surface 41 that has the first concave surface 42 and the second concave surface 43 can be shaped by having, on the outer circumferential surface of the blank 100, two truncated cone parts that have tilt angles of different degrees although illustrations thereof are omitted. Thus, the thread grooves 32 are formed by performing, on an outer circumferential part of the second columnar part 103, thread rolling in which pressure is applied thereto inward in the radial directions. The first outer circumferential surface 111 of the first truncated cone part 124 and the second outer circumferential surface 112 of the second truncated cone part 125 can be thereby plastically deformed in such a manner as to span along the radial directions.

Figure 9:
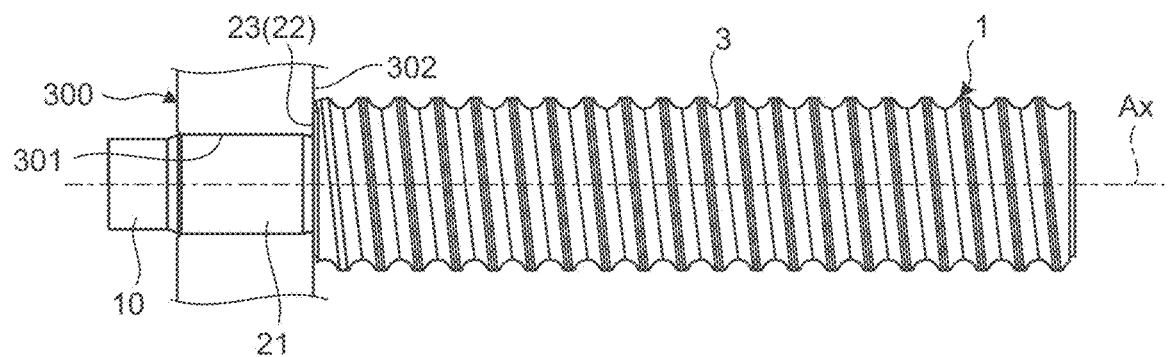
FIG. 9 is a schematic view illustrating a state in which an inner ring of a bearing has been press-fit onto a rolled thread screw.

Next, one of the examples of utilization of the rolled thread screw 1 is described. FIG. 9 is a schematic view illustrating a state in which an inner ring of a bearing has been press-fit onto the rolled thread screw.

As illustrated in FIG. 9, the small-diameter part 21 of the shaft part 11 is press-fit against an inner circumferential surface 301 of an inner ring 300 of the bearing. As a result, one end part of the rolled thread screw 1 that faces in a first axial direction thereof is rotatably supported by the inner ring 300 of the bearing. In addition, an axial end surface 302 of the inner ring 300 is in contact with the axial end surface 23 of the large-diameter part 22 of the rolled thread screw 1.

Comparative Example

Figure 10:
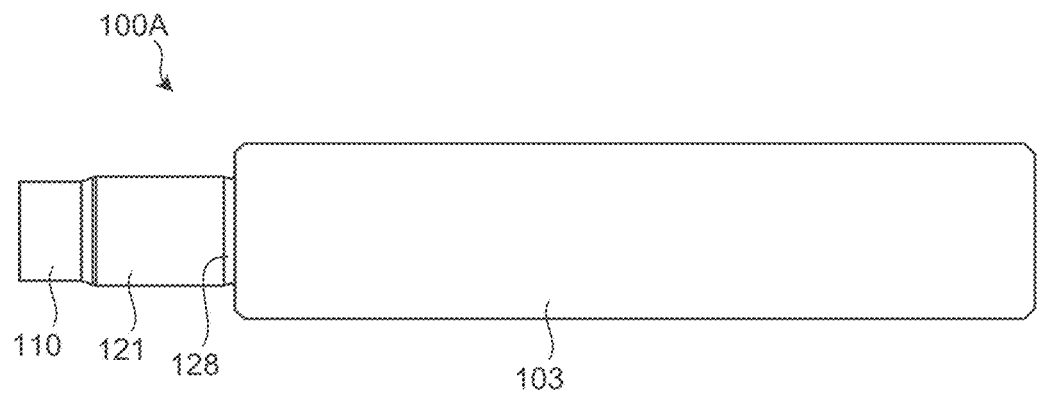
FIG. 10 is a side view illustrating a blank for a rolled thread screw according to a comparative example.
Figure 11:
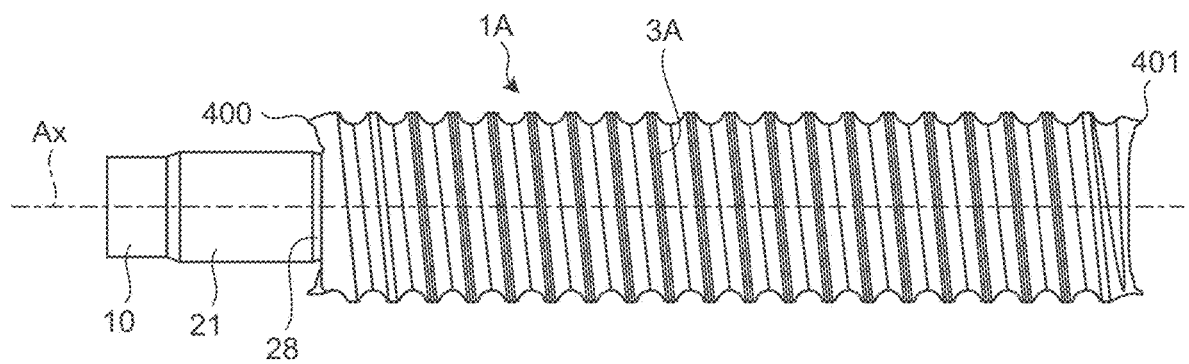
FIG. 11 is a side view of the rolled thread screw according to the comparative example, which illustrates the state thereof before deburring thereof.
Figure 12:
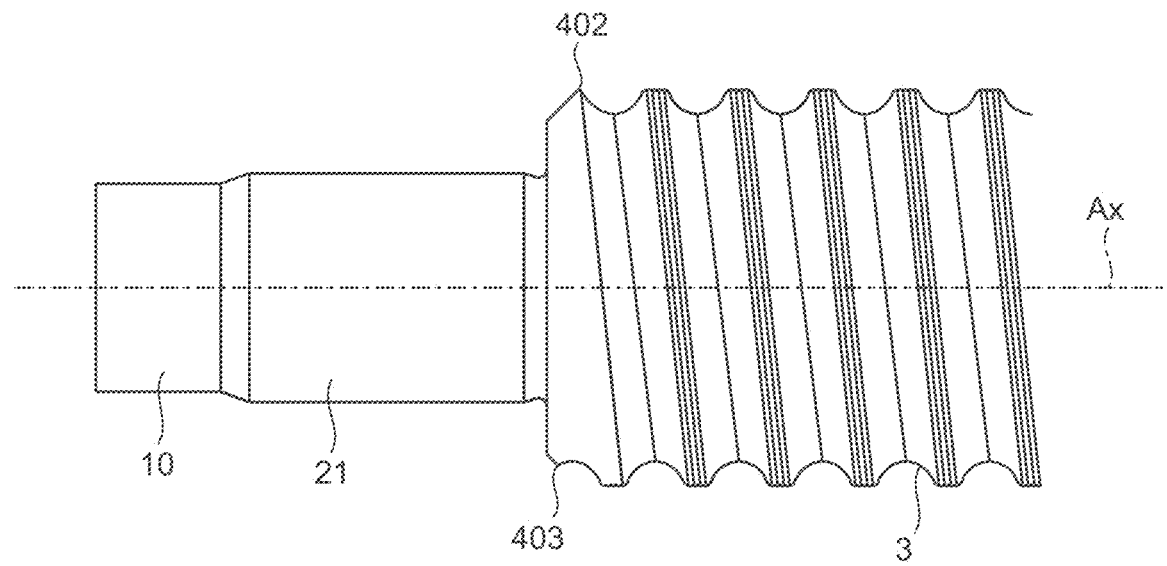
FIG. 12 is a side view illustrating an end part of the rolled thread screw according to the comparative example that faces in a second axial direction thereof, which illustrates the state thereof after deburring thereof.
Figure 13:
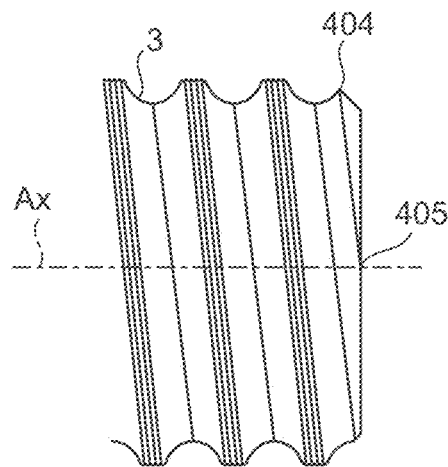
FIG. 13 is a side view illustrating another end part of the rolled thread screw according to the comparative example that faces in a first axial direction thereof, which illustrates the state thereof after deburring thereof.

Next, a comparative example is described. FIG. 10 is a side view illustrating a blank for a rolled thread screw according to a comparative example. FIG. 11 is a side view of the rolled thread screw according to the comparative example, which illustrates the state thereof before deburring thereof. FIG. 12 is a side view illustrating an end part of the rolled thread screw according to the comparative example that faces in a second axial direction thereof, which illustrates the state thereof after deburring thereof. FIG. 13 is a side view illustrating another end part of the rolled thread screw according to the comparative example that faces in a first axial direction thereof, which illustrates the state thereof after deburring thereof.

As compared with the blank 100 according to the embodiment illustrated in FIG. 6, a blank 100A according to the comparative example illustrated in FIG. 10 is not provided with the first truncated cone part 124, the second truncated cone part 125, the first columnar part 122, and the third columnar part 104. Therefore, as illustrated in FIG. 11, an intermediary screw body 1A obtained by performing thread rolling has burrs 400 and 401 on axial end surfaces of a screw part 3A that project in the axial directions. This necessitates work of planing end-part wall surfaces of the second columnar part 103 along the radial directions at a step after the thread rolling in order to remove the burrs 400 and 401 as illustrated in FIG. 12 and FIG. 13. However, there is a possibility that planing the end-part wall surfaces may result in the formation of thread crests at sharp edges 402, 403, and 404 and in the formation of a sharp edge 405 at the end-part wall surfaces, as illustrated in FIG. 12 and FIG. 13.

As described above, the rolled thread screw 1 according to the present embodiment includes the screw part 3 having the thread crests 31 and the thread grooves 32, the columnar parts 2 and 4 provided to both sides of the screw part 3 in the axial directions. The axial end surfaces 23 and 41 are provided with the first concave surfaces 24 and 42, the second concave surfaces 25 and 43, and the salient parts 26 and 44 extending in arc-like shapes in the respective circumferential directions of the axial end surfaces 23 and 41.

Generation of the burr 400 can be prevented by providing salient excess-thickness portions, such as the first truncated cone part 124 and the second truncated cone part 125, in one side of the blank 100, which is used in manufacturing the rolled thread screw 1, the one side facing in the second axial direction. As a result, work such as buffing and deburring grinding can be reduced. Quality checking work for checking whether there is any burr can also be reduced. Furthermore, the axial end surfaces 23 and 41 of the columnar parts 2 and 4 are formed flatly because the first concave surfaces 24 and 42, the second concave surfaces 25 and 43, and the salient parts 26 and 44 are disposed along the radial directions. As a result, the rolled thread screw 1 that has prevented generation of burrs and that has the axial end surfaces 23 and 41 of the columnar parts 2 and 4 formed flatly can be obtained. Particularly when a QR code (registered trademark) or data for product management is engraved on the axial end surface 41 by laser processing or the like, it is desirable that the axial end surface 41 has a higher degree of flatness. Note that the swelling part 33 illustrated in FIG. 5 is formed by applying pressure inward in the radial directions to the second columnar part 103 including even the leading end thereof facing in the second axial direction. Thus, the thread grooves 32 can be provided on the screw part 3 including the leading end thereof facing in the second axial direction, whereby the effective length of the screw part 3 can be set longer than otherwise. In addition, the leading end of the swelling part 33, which faces in the second axial direction, is positioned further in the first axial direction from the axial end surface 23.

The rolled thread screw manufacturing method uses the blank 100. The blank 100 includes the first truncated cone part 124 having the first outer circumferential surface 111, the second truncated cone part 125 having the second outer circumferential surface 112, the first columnar part 122, and the second columnar part 103. The thread grooves 32 are formed by performing, on the outer circumferential part of the second columnar part 103, thread rolling in which pressure is applied thereto inward in the radial directions. The first outer circumferential surface 111 of the first truncated cone part 124 and the second outer circumferential surface 112 of the second truncated cone part 125 are thereby plastically deformed in such a manner as to span along the radial directions.

Unlike the blank 100 according to the embodiment, the blank 100A according to the comparative example is not provided with the first truncated cone part 124, the second truncated cone part 125, the first columnar part 122, and the third columnar part 104, as described for the comparative example. When thread rolling is performed using this blank 100A, the burrs 400 and 401 illustrated in FIG. 11 are formed, and thus work of removing the burrs 400 and 401 is necessitated. Furthermore, there is a possibility that the sharp edges 402, 403, 404, and 405 may be formed on the thread crests or on the end-part wall surfaces when the end-part wall surfaces are planed for the purpose of removing the burrs 400 and 401, as illustrated in FIG. 12 and FIG. 13.

In contrast, the blank 100 according to the present embodiment is provided with the first truncated cone part 124, the second truncated cone part 125, and the first columnar part 122, thereby being advantageous in that burrs and sharp edges that may be formed in the comparative example are less likely to be formed. Generation of the burr 400 in the comparative example illustrated in FIG. 11 can be prevented particularly by providing salient excess-thickness portions, such as the first truncated cone part 124 and the second truncated cone part 125, in one side of the blank 100 that face in the second axial direction. As a result, work of removing burrs such as buffing and deburring grinding can be reduced. Quality checking work for checking whether there is any burr can also be reduced. Note that the application of in-feed thread rolling in the present embodiment is advantageous in that a production yield from the blank 100 is higher than when through-feed thread rolling is applied.

In addition, as illustrated in FIG. 5, the large-diameter part 22 (the columnar part 2) is provided, and the leading end of the swelling part 33 that faces in the second axial direction, positioned further in the first axial direction from the axial end surface 23. Therefore, even when the swelling part 33 has been formed on the end-part wall surface 34 with pressure acting inward in the radial directions as a result of thread rolling, there is no possibility that the swelling part 33 projects in the second axial direction beyond the axial end surface 23. As a result, as described with reference to FIG. 9, the axial end surface 302 of the inner ring 300 reliably abuts on the axial end surface 23 of the large-diameter part 22 of the rolled thread screw 1.

When the thread grooves 32 are formed by performing, on the outer circumferential part of the second columnar part 103, thread rolling in which pressure is applied thereto inward in the radial directions, the first outer circumferential surface 111 is formed into the first concave surface 24, the second outer circumferential surface 112 is formed into the second concave surface 25, and the salient part 26 is formed on the boundary between the first concave surface 24 and the second concave surface 25.

As illustrated in FIG. 11, thread rolling using the blank 100A according to the comparative example may cause end-part wall surfaces of the screw part 3A to fall down into shapes extending in the axial directions, which become the burrs 400 and 401. In contrast, salient excess-thickness portions, such as the first truncated cone part 124 and the second truncated cone part 125, are provided to one side of the blank 100 according to the present embodiment that faces in the second axial direction. When such salient excess-thickness portions are provided, it is made possible to prevent the end-part wall surfaces of the screw part 3A from falling down into shapes extending in the axial directions, which become the burrs 400 and 401, as in the case of the comparative example. Thus, in in-feed thread rolling, thread rolling using the blank 100 according to the present embodiment can prevent generation of burrs to a larger extent than thread rolling using the blank 100A according to the comparative example. That is, in-feed thread rolling according to the present embodiment generates a smaller amount of burrs than through-feed thread rolling according to a conventional example, and among in-feed thread rolling alternatives, thread rolling using the blank 100 according to the present embodiment, rather than the comparative example, can further reduce generation of burrs.

First Modification

Figure 14:
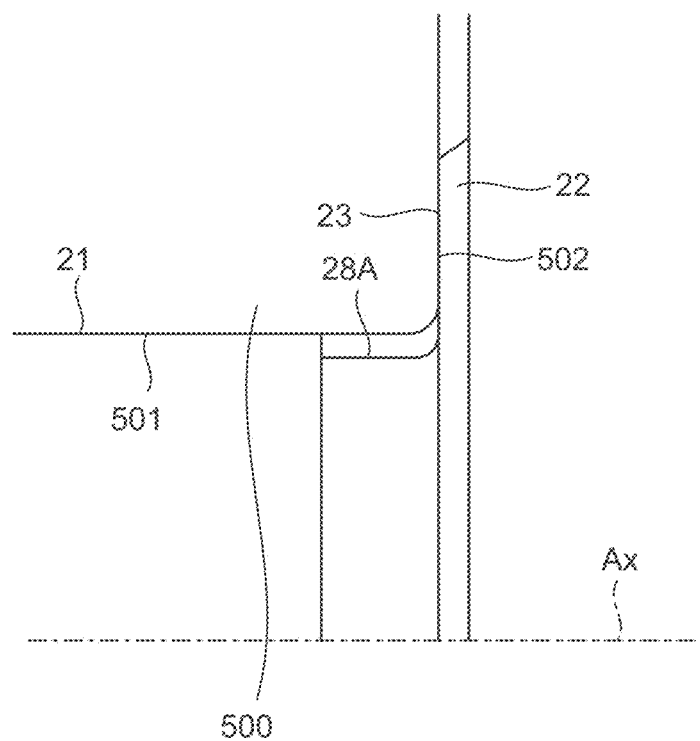
FIG. 14 is an enlarged schematic view of a part of a rolled thread screw according to a first modification.

Next, a first modification is described. FIG. 14 is an enlarged schematic view of a part of a rolled thread screw according to the first modification. In the embodiment, as illustrated in FIG. 7, the sectional shape of the bottom surface of the groove part 128 in a section that contains the shaft center Ax is arc-like. In contrast, as illustrated in FIG. 14, the sectional shape of the bottom surface of a groove part 28A according to the modification is linear along the shaft center Ax. That is, the bottom surface of the groove part 28A has a cylindrical shape extending in a circumferential direction with the shaft center Ax at the center. The small-diameter part 21 of the shaft part 11 is press-fit against an inner circumferential surface 501 of an inner ring 500 of a bearing. As a result, a gap between the inner circumferential surface 501 of the inner ring 500 of the bearing and the bottom surface of the groove part 28A in the radial directions is uniform in size in the axial directions.

As described above, the sectional shape of the bottom surface of the groove part 28A according to the first modification is linear along the shaft center Ax. For this reason, the end-part wall surfaces of the screw part 3 are further less likely to fall down, due to pressure when thread rolling is performed, into shapes extending in the axial directions. Generation of the burrs 400 and 401 is thereby further prevented. Thus, an axial end surface 502 of the inner ring 500 of the bearing more reliably abuts on the axial end surface 23 of the large-diameter part of the rolled thread.

Second Modification

Figure 15:
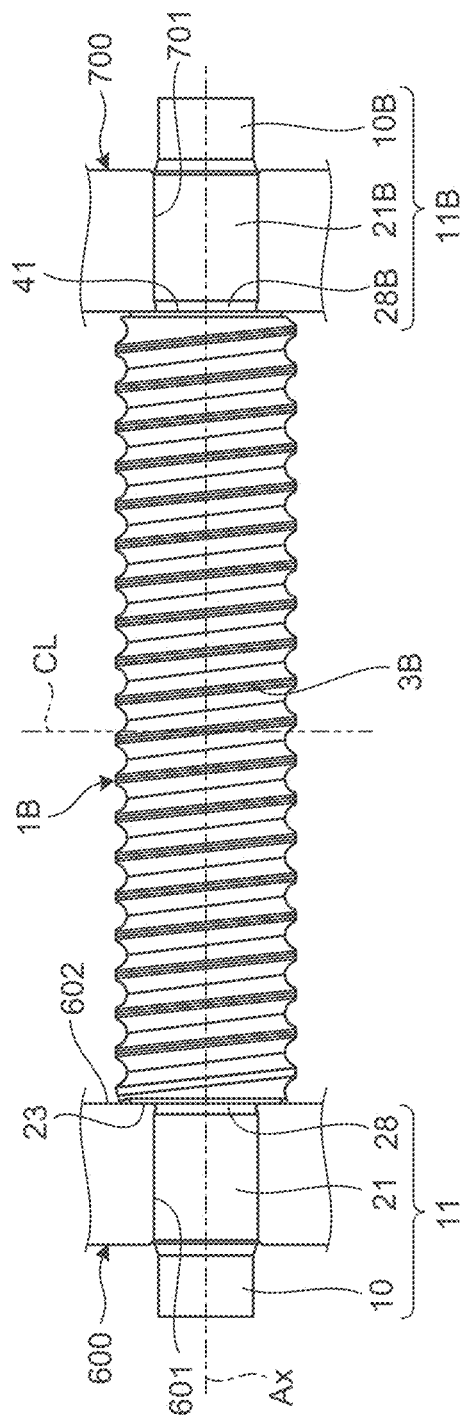
FIG. 15 is a schematic view illustrating a state in which an inner ring of a bearing is being press-fit onto a rolled thread screw according to a second modification.

Next, a second modification is described. FIG. 15 is a schematic view illustrating a state in which an inner ring of a bearing is being press-fit onto a rolled thread screw according to the second modification. A rolled thread screw 1B according to the second modification further includes a shaft part 11B in the rolled thread screw 1 according to the embodiment. That is, the rolled thread screw 1B is provided with the shaft part 11 and the shaft part 11B on two opposite sides of a screw part 3B in the axial directions. The shaft part 11B includes, in order along the axial directions, a narrow-diameter part 10B, a small-diameter part 21B, and a groove part 28B. The narrow-diameter part 10B and the small-diameter part 21B are columnar. The small-diameter part 21B adjoins one side that faces in the second axial direction (a leftward side in FIG. 15) of the narrow-diameter part 10B. The small-diameter part 21B has a larger outer diameter than the narrow-diameter part 10B. The groove part 28B adjoins one side that faces in the second axial direction (a leftward side in FIG. 15) of the small-diameter part 21B. The groove part 28B has an arc-like shape concave inward in the radial directions. As illustrated in FIG. 15, the small-diameter part 21 of the shaft part 11 is press-fit against an inner circumferential surface 601 of an inner ring 600 of a bearing. The small-diameter part 21B of the shaft part 11B is press-fit against an inner circumferential surface 701 of an inner ring 700 of a bearing.

As described above, in the rolled thread screw 1B according to the second modification, the shaft part 11 and the shaft part 11B are provided on both sides of the screw part 3B in axial directions. Therefore, two opposite end parts of the rolled thread screw 1B in the axial directions can be supported by bearings, whereby irregular rotation of the rolled thread screw 1B can be prevented when the rolled thread screw 1B is rotated.

REFERENCE SIGNS LIST 2, 4 COLUMNAR PART
3 SCREW PART
22 LARGE-DIAMETER PART (COLUMNAR PART)
23, 41 AXIAL END SURFACE
24, 42 FIRST CONCAVE SURFACE
25, 43 SECOND CONCAVE SURFACE
26, 44 SALIENT PART
31 THREAD CREST
32 THREAD GROOVE
100 BLANK
103 SECOND COLUMNAR PART
111 FIRST OUTER CIRCUMFERENTIAL SURFACE
112 SECOND OUTER CIRCUMFERENTIAL SURFACE
122 FIRST COLUMNAR PART
124 FIRST TRUNCATED CONE PART
125 SECOND TRUNCATED CONE PART
321 ROOT PART
CL FIRST CENTRAL PART

The invention claimed is:

1. A rolled thread screw manufacturing method comprising:
   a preparation step of preparing a blank; and
   a processing step of plastically deforming the blank into a rolled thread screw, wherein
   the blank that is prepared at the preparation step is a columnar blank including a first truncated cone part having a first outer circumferential surface having an outer diameter that is larger toward one side of the rolled thread screw that faces in a first axial direction of the rolled thread screw, a second truncated cone part disposed adjoining one side of the first truncated cone part that faces in the first axial direction and having a second outer circumferential surface having an outer diameter that is larger toward the one side of the rolled thread screw, a first columnar part adjoining one side of the second truncated cone part that faces in the first axial direction, a second columnar part adjoining one side of the first columnar part that faces in the first axial direction and having a larger outer diameter than the first columnar part, an outer diameter of an end of the first truncated cone part that faces in the first axial direction is identical to an outer diameter of an end of the second truncated cone part that faces in a second axial direction that is opposite to the first axial direction, an outer diameter of an end of the second truncated cone part that faces in the first axial direction is equal to an outer diameter of an end of the first columnar part that faces in the second axial direction, at the processing step:
thread rolling in which pressure is applied to an outer circumferential part of the second columnar part inward in radial directions of the rolled thread screw is performed to form thread grooves, and the first outer circumferential surface of the first truncated cone part and the second outer circumferential surface of the second truncated cone part are thereby plastically deformed in such a manner as to span along the radial directions;

the first outer circumferential surface is formed into a first concave surface spreading in the radial directions and being concave in the first axial direction;

the second outer circumferential surface is formed into a second concave surface disposed to an outer circumference of the first concave surface, spreading in the radial directions, and being concave in the first axial direction; and a salient part projecting in the second axial direction is formed on a boundary between the first concave surface and the second concave surface, the salient part extending in an arc-like shape along a circumferential direction as viewed in the axial direction.

* * * * *